(12) United States Patent
Line et al.

(10) Patent No.: US 8,955,910 B2
(45) Date of Patent: Feb. 17, 2015

(54) RECLINER SWING-GATE CONTROL SPACER

(71) Applicant: Ford Global Technologies, LLC, Dearborn, MI (US)

(72) Inventors: Johnathan Andrew Line, Northville, MI (US); Khaled Ayyash, Ann Arbor, MI (US); Jeffrey Gabalski, West Bloomfield, MI (US); Robert Jen-Yue Du, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 13/870,656

(22) Filed: Apr. 25, 2013

(65) Prior Publication Data

US 2013/0313877 A1 Nov. 28, 2013

Related U.S. Application Data

(60) Provisional application No. 61/651,895, filed on May 25, 2012.

(51) Int. Cl.
*B60N 2/235* (2006.01)
*B60N 2/22* (2006.01)

(52) U.S. Cl.
CPC ............ *B60N 2/2245* (2013.01); *B60N 2/2356* (2013.01)
USPC ................. 297/367 P; 297/367 R; 297/367 L

(58) Field of Classification Search
USPC ................................ 297/367 R, 367 P, 367 L
See application file for complete search history.

(56) References Cited

U.S. PATENT DOCUMENTS

| 6,112,370 | A * | 9/2000 | Blanchard et al. .... | 297/367 R X |
|---|---|---|---|---|
| 7,571,963 | B2 * | 8/2009 | Peters et al. .............. | 297/367 R |
| 7,677,667 | B2 * | 3/2010 | Peters et al. .............. | 297/367 R |
| 7,703,852 | B2 * | 4/2010 | Wahls et al. .............. | 297/367 R |
| 2003/0230923 | A1 * | 12/2003 | Uramichi ...................... | 297/367 |
| 2007/0137393 | A1 * | 6/2007 | Peters .......................... | 74/502.4 |
| 2008/0175658 | A1 * | 7/2008 | Peters .......................... | 403/349 |

* cited by examiner

*Primary Examiner* — Rodney B White
(74) *Attorney, Agent, or Firm* — Vichit Chea; Price Heneveld LLP

(57) ABSTRACT

A recliner heart spacer ring includes a body portion having a substantially consistent inner diameter. First and second inner cutouts are diametrically opposed from one another. First and second pairs of retention features are diametrically opposed from one another and are adapted to engage a swing gate of a recliner heart. The recliner heart spacer ring guides the swing gate as the swing gate transitions between a range of positions associated with a seat back.

19 Claims, 10 Drawing Sheets

RECLINER SWING-GATE CONTROL SPACER

CROSS-REFERENCE TO RELATED APPLICATION

This application claims the benefit of and priority to U.S. Provisional Patent Application No. 61/651,895, filed on May 25, 2012, entitled "RECLINER SWING-GATE CONTROL SPACER," the entire disclosure of which is hereby incorporated herein by reference.

FIELD OF THE INVENTION

The present invention generally relates to a control spacer for a seat recliner, and more particularly to a recliner swing gate control spacer.

BACKGROUND OF THE INVENTION

Vehicle seat assemblies generally include reclining capabilities, such that a user may position a seat back at a variety of angles relative to the seat. A robust recliner heart provides secure engagement of the seat back at a particular position relative to the seat to properly support a user while seated.

SUMMARY OF THE INVENTION

According to one aspect of the present invention, a recliner heart spacer ring includes a body portion having a substantially consistent inner diameter. First and second inner cutouts are diametrically opposed from one another. First and second pairs of retention features are diametrically opposed from one another and are adapted to engage a swing gate of a recliner heart. The recliner heart spacer ring guides the swing gate as the swing gate transitions between a range of positions associated with a seat back.

According to another aspect of the present invention, a recliner heart includes a recliner heart spacer ring having a body portion including a substantially consistent inner diameter. First and second inner cutouts are diametrically opposed from one another. First and second retention features are diametrically opposed from one another. Third and fourth retention features are diametrically opposed from one another. A swing gate includes retention tabs adapted to engage the first and second pairs of retention features of the recliner heart spacer ring.

According to yet another aspect of the present invention, a recliner heart for a vehicle seat includes a recliner heart spacer ring having a body portion including a substantially consistent inner diameter. First and second inner cutouts are diametrically opposed from one another. First and second pairs of outer retention features are included. A swing gate includes retention tabs adapted to engage the first and second pairs of retention features of the recliner heart spacer ring. A housing is disposed around the first and second pairs of retention features.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
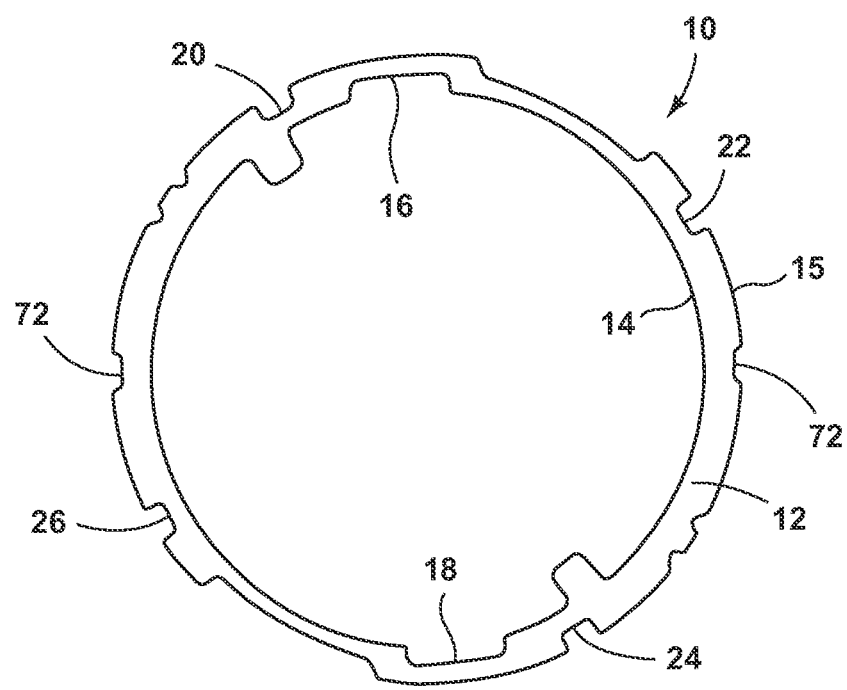
FIG. 1 is a top plan view of one embodiment of a recliner heart spacer ring of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
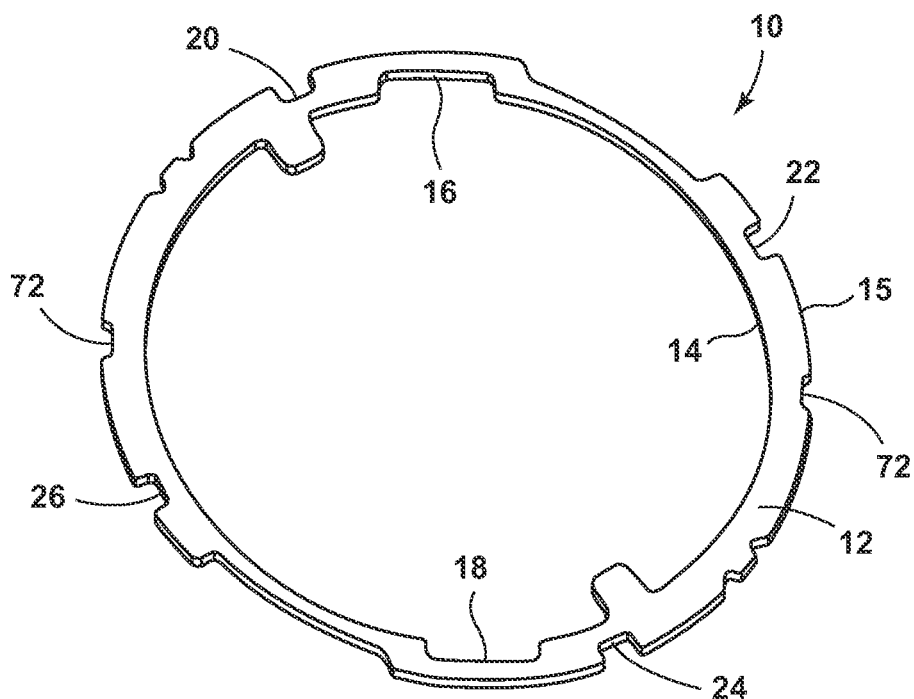
FIG. 2 is a top perspective view of the recliner heart spacer ring of FIG. 1.

Referring to FIGS. 1 and 2, reference numeral 10 generally designates a recliner heart spacer ring including a body portion 12 having inner and outer walls 14, 15. First and second inner cutouts 16, 18 are diametrically opposed from one another. Outer retention features 20, 22, 24, 26 are adapted to engage retention tabs 28 of a swing gate 30 of a recliner heart 32 (shown in FIGS. 3-4). The recliner heart spacer ring 10 guides the swing gate 30 as the components of the recliner heart 32 move.

Figure 3:
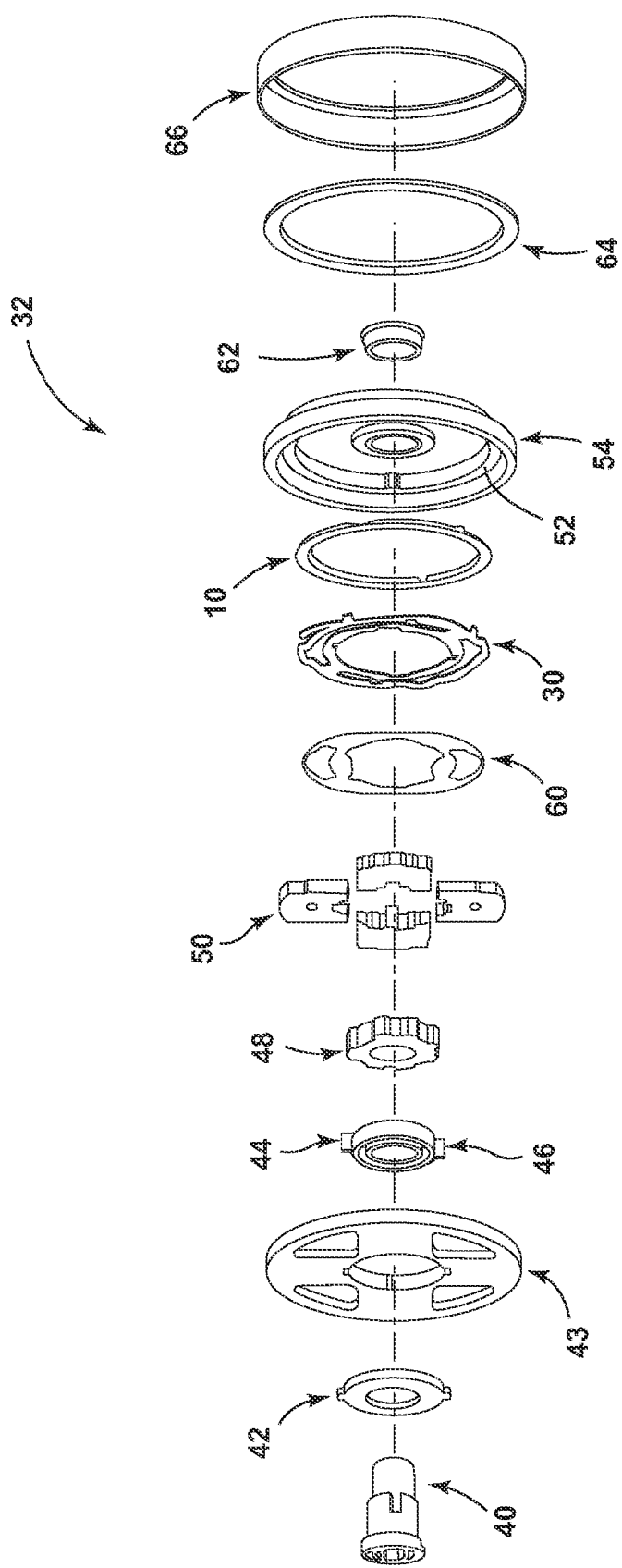
FIG. 3 is an exploded side perspective view of a recliner heart of the present invention.
Figure 4:
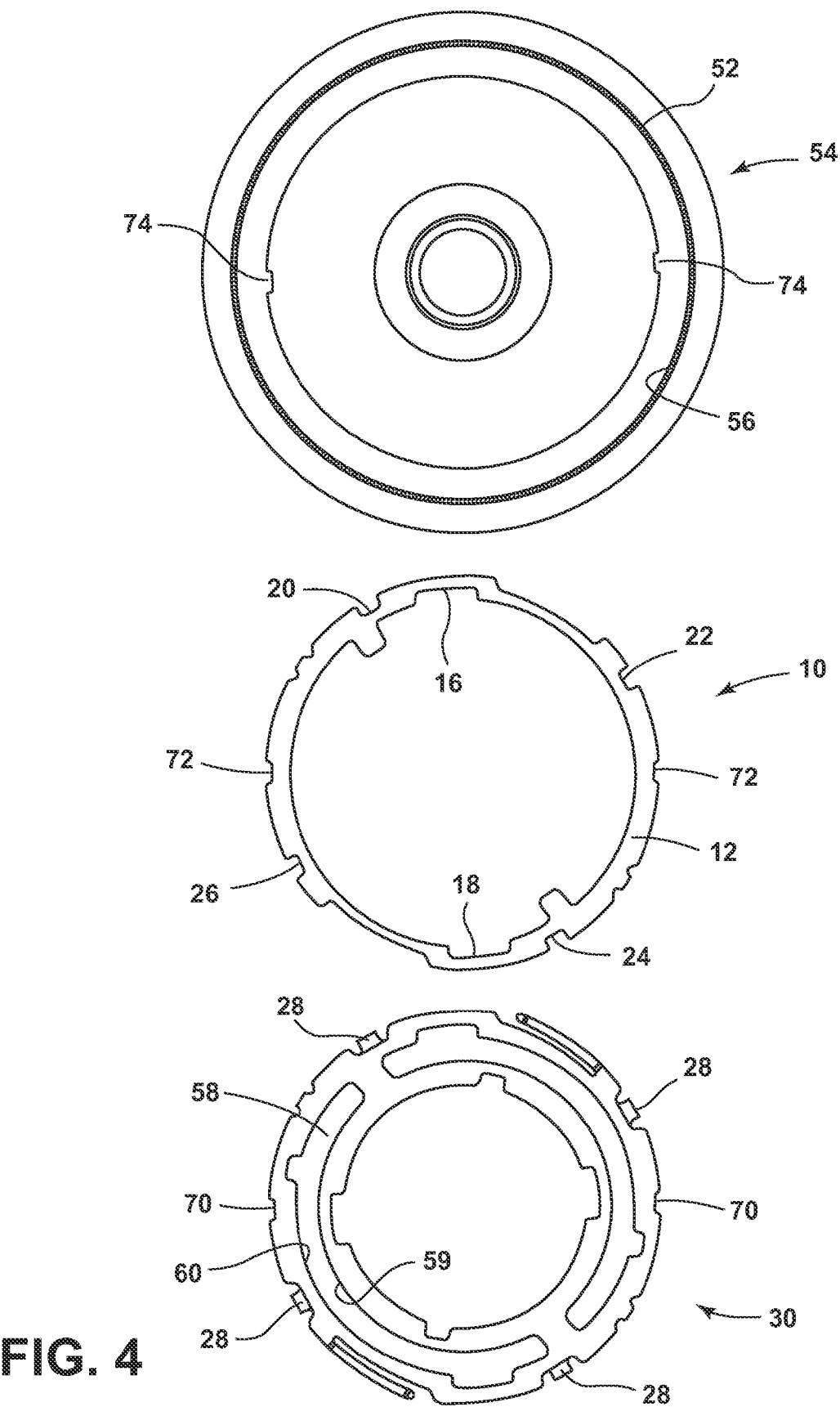
FIG. 4 is a top plan view of a recliner heart spacer ring, gear rim and swing gate of the present invention.
Figure 5:
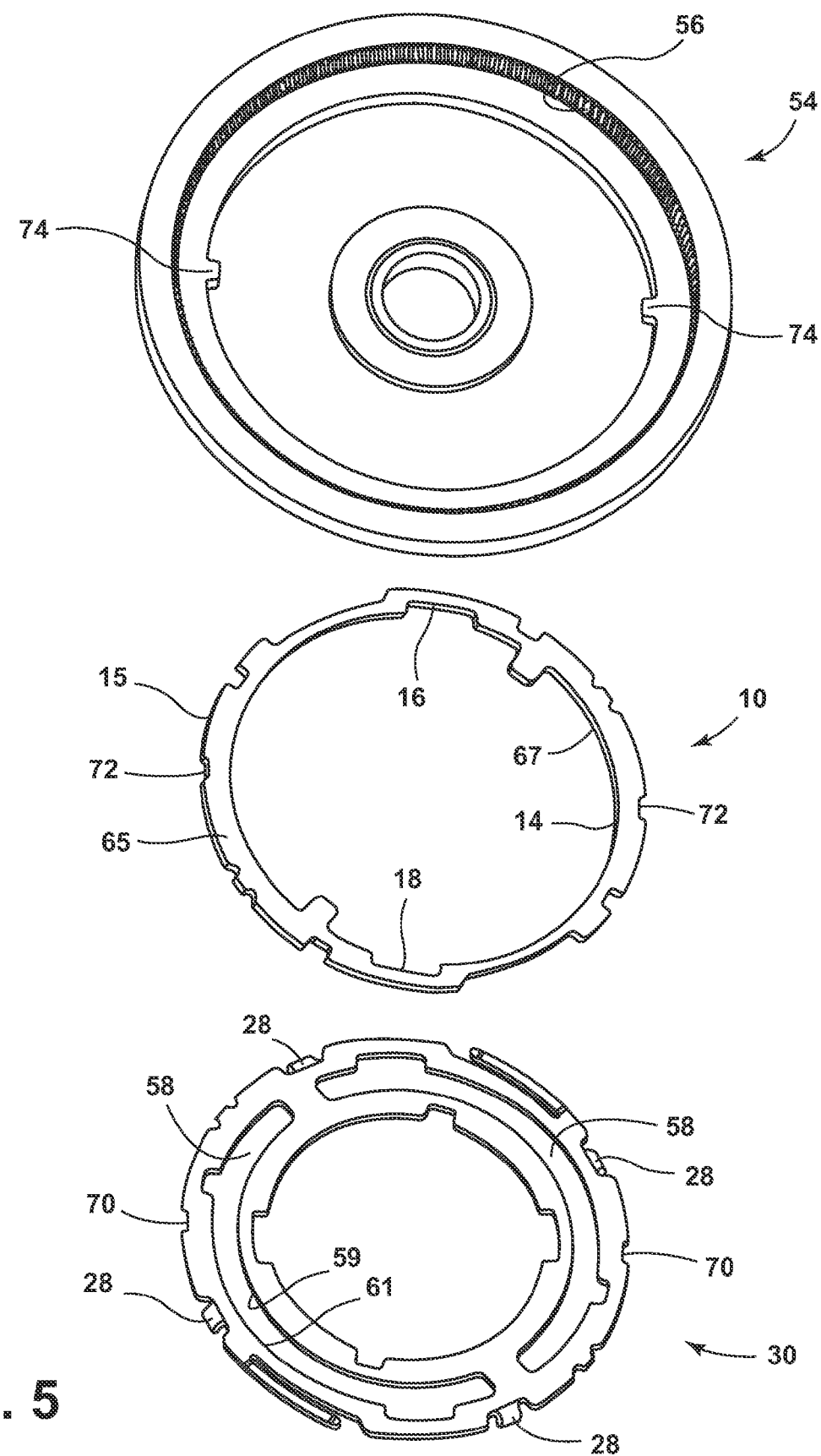
FIG. 5 is a top perspective view of the recliner heart spacer ring, gear rim, and swing gate of FIG. 4.
Figure 6:
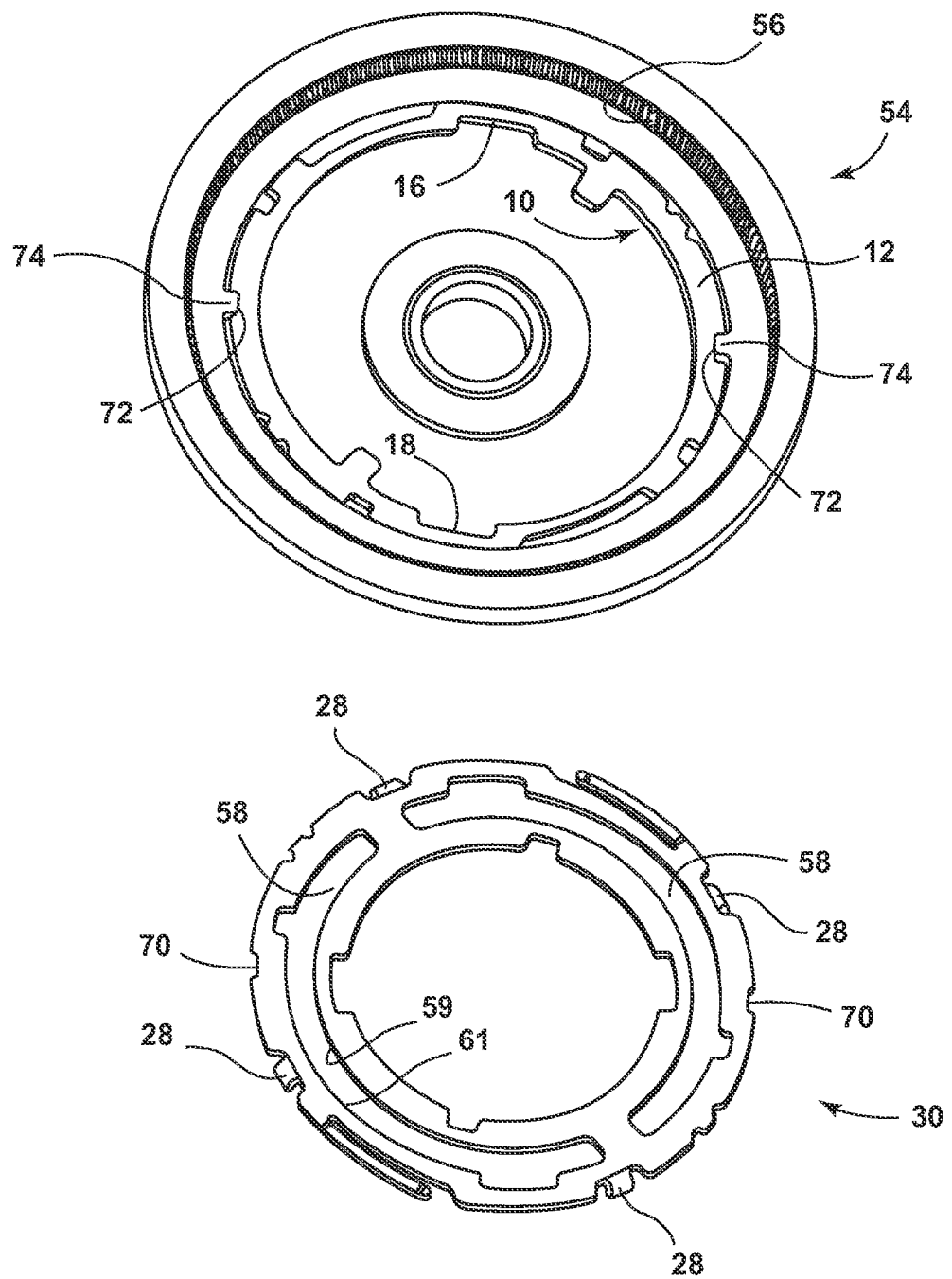
FIG. 6 is a top perspective view of a recliner heart spacer ring installed in a gear rim before installation of a swing gate into the gear ring.
Figure 7:
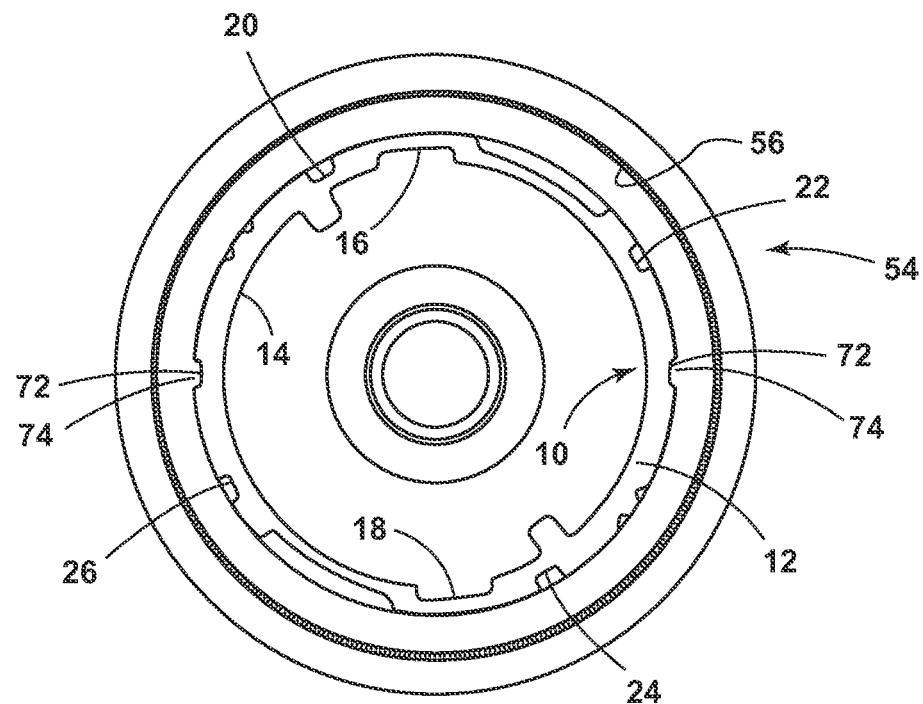
FIG. 7 is a top plan view of the recliner heart spacer ring, swing gate and gear rim of FIG. 6.
Figure 7:
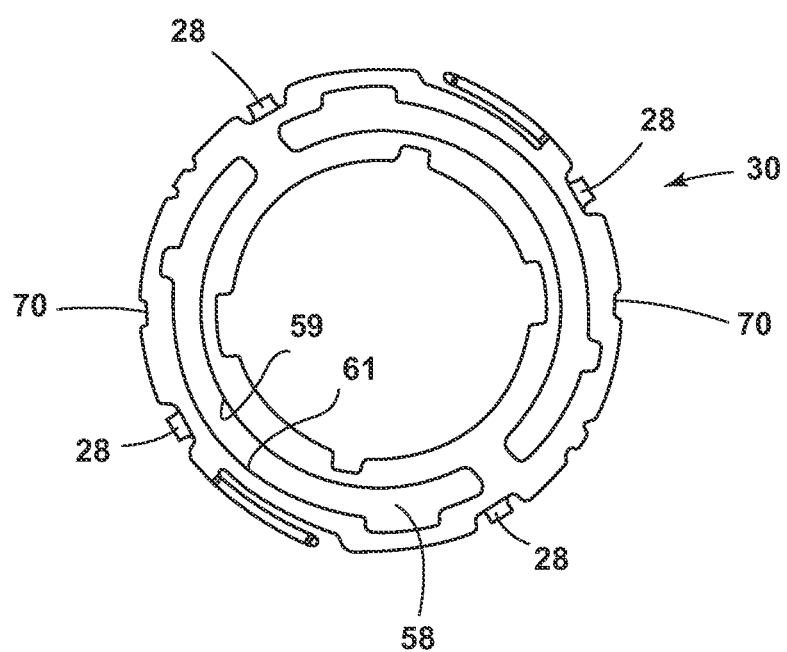

Referring now to FIGS. 3 and 4, one embodiment of the recliner heart 32 is illustrated. The recliner heart 32 includes a driver 40 that is rotatably coupled with the recliner heart 32. The driver 40 extends through a disc cap 42 and a guide 43, as well as first and second clock springs 44, 46. The first and second clock springs 44, 46 are in abutting contact with a cam 48 that is in abutting contact with a number of pawls 50 that move radially inward and outward and engage an inner circumferential area 52 of a gear rim 54 that has a plurality of teeth 56 (FIGS. 5 and 6). In the illustrated embodiment, there are four pawls 50 that are biased outwardly by the first and second clock springs 44, 46. The pawls 50 are movably associated with channels 58 in the swing gate 30. The channels 58 in the swing gate 30 are defined by inner and outer edges 59, 61. The swing gate 30 is disposed between a control disc 60 and the spacer ring 10 and allows for rotational movement of the driver 40 relative to the gear rim 54. The spacer ring 10 is disposed between the swing gate 30 and the gear rim 54. The driver 40 extends through a rear wall of the gear rim 54 and into a welding ring 62. The welding ring 62 holds the driver 40 in place in the gear rim 54. A bearing ring 64 is disposed on a back side of the gear rim 54 adjacent to a clamping ring 66 that helps hold the recliner heart together.

Referring now to FIGS. 4-7, the spacer ring 10 is designed to engage the swing gate 30 and to ensure proper functionality of the swing gate 30 as the pawls 50 (shown in FIG. 3) rotate through various positions in the channels 58 in the swing gate 30. The spacer ring 10 includes a first side 65 adjacent the swing gate 30 and a second side 67 adjacent the gear rim 54, as well as the inner and outer walls 14, 15. The spacer ring 10 fits under the profile of the swing gate 30 and the outer retention features 20, 22, 24, 26 provide support for the retention tabs 28 of the swing gate 30. The spacer ring 10 prevents traditional retention tab features 70 of the swing gate 30 from skipping or disengaging the gear rim 54 of the recliner heart 32. Rim engagement features 72 on the spacer ring 10 engage engagement features 74 of the gear rim 54. The shape of the spacer ring 10 complements the configuration of the swing gate 30, thereby ensuring that the spacer ring 10 does not interfere with recliner pawls 50 as the recliner pawls 50 travel through the channels 58 of the swing gate 30. The spacer ring 10 can also be modified, such that stop features within the recliner heart 32, and under the configuration of the swing gate 30, are eliminated. The addition of the spacer ring 10 prevents the swing gate 30 from entering a failure mode, wherein the swing gate 30 is disengaged from the recliner heart 32 at traditional tab features 70 of the swing gate 30.

Referring now to FIGS. 6-9, during assembly, the swing gate 30 is configured so that the retention tabs 28 define catches configured to engage the outer retention features 20, 22, 24, 26 of the spacer ring 10. The retention tabs 28 can be integral with the swing gate 30 or be added to the swing gate 30 via welding, adhesive, etc. The retention tabs 28 may also be bent at an angle relative to the planar extent of the swing gate 30. In one embodiment, the retention tabs 28 extend at an angle of 90 degrees relative to the planar extent of the swing gate 30. The spacer ring 10 is first installed into the gear rim 54, and then the swing gate 30 is installed into the gear rim 54 such that one retention tab 28 is aligned with one of the outer retention features 20, 22, 24, 26. The spacer ring 10 maintains the position of the swing gate 30 in the gear rim 54. Accordingly, the swing gate 30 does not become disengaged from the gear rim 54 and can serve to properly guide the pawls 50 as the pawls 50 transition through the channels 58.

Figure 8:
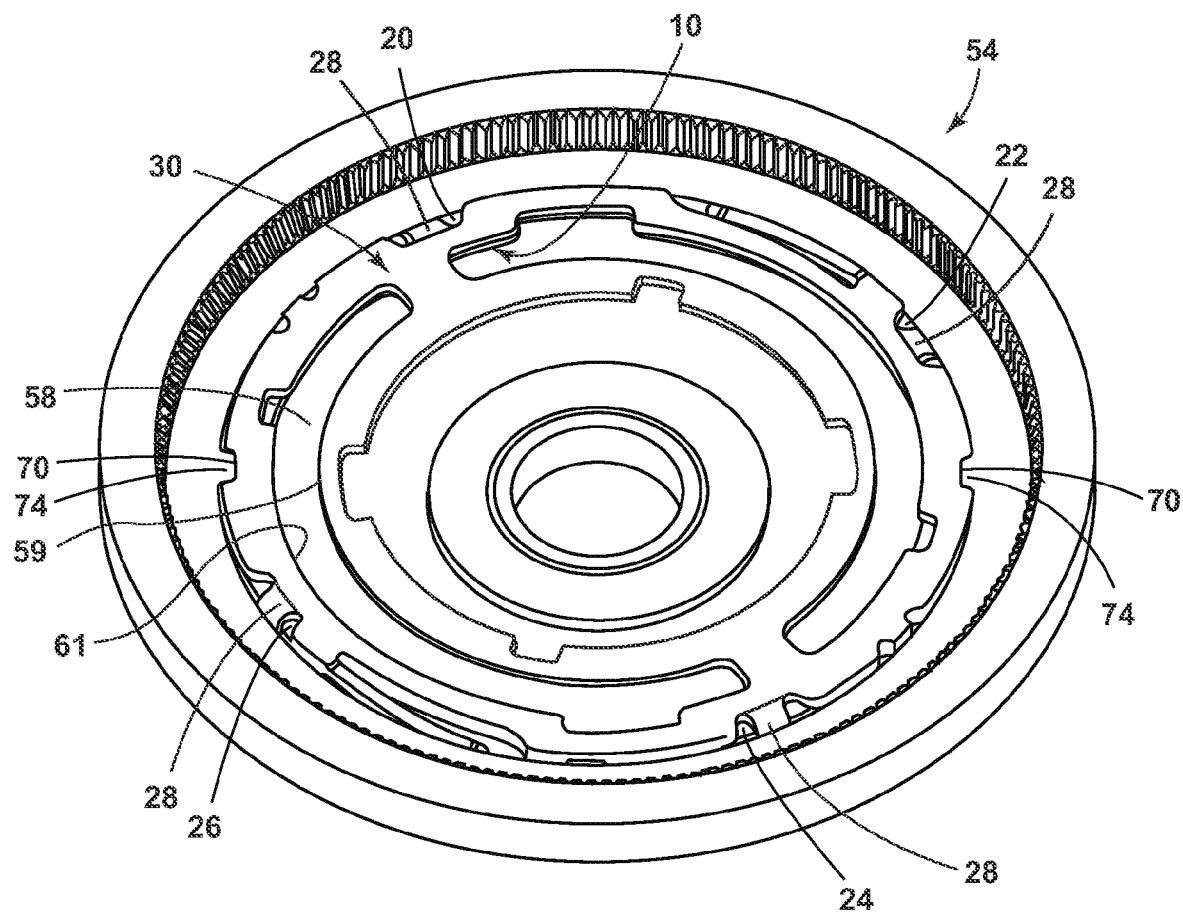
FIG. 8 is a top perspective view of a recliner heart spacer ring and swing gate installed in a gear rim.
Figure 9:
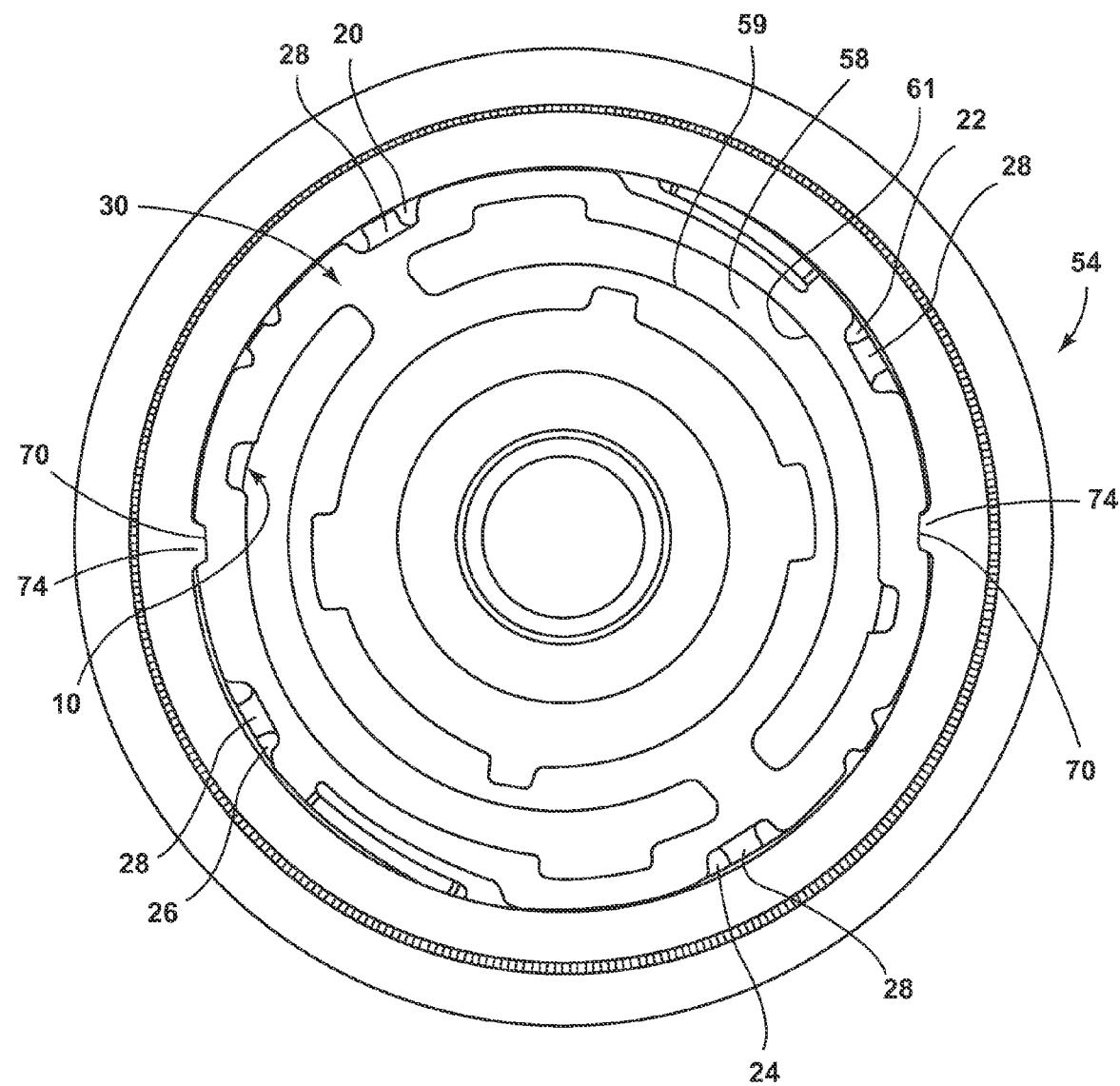
FIG. 9 is a top plan view of the recliner heart spacer ring, swing gate and gear rim of FIG. 8.
Figure 10:
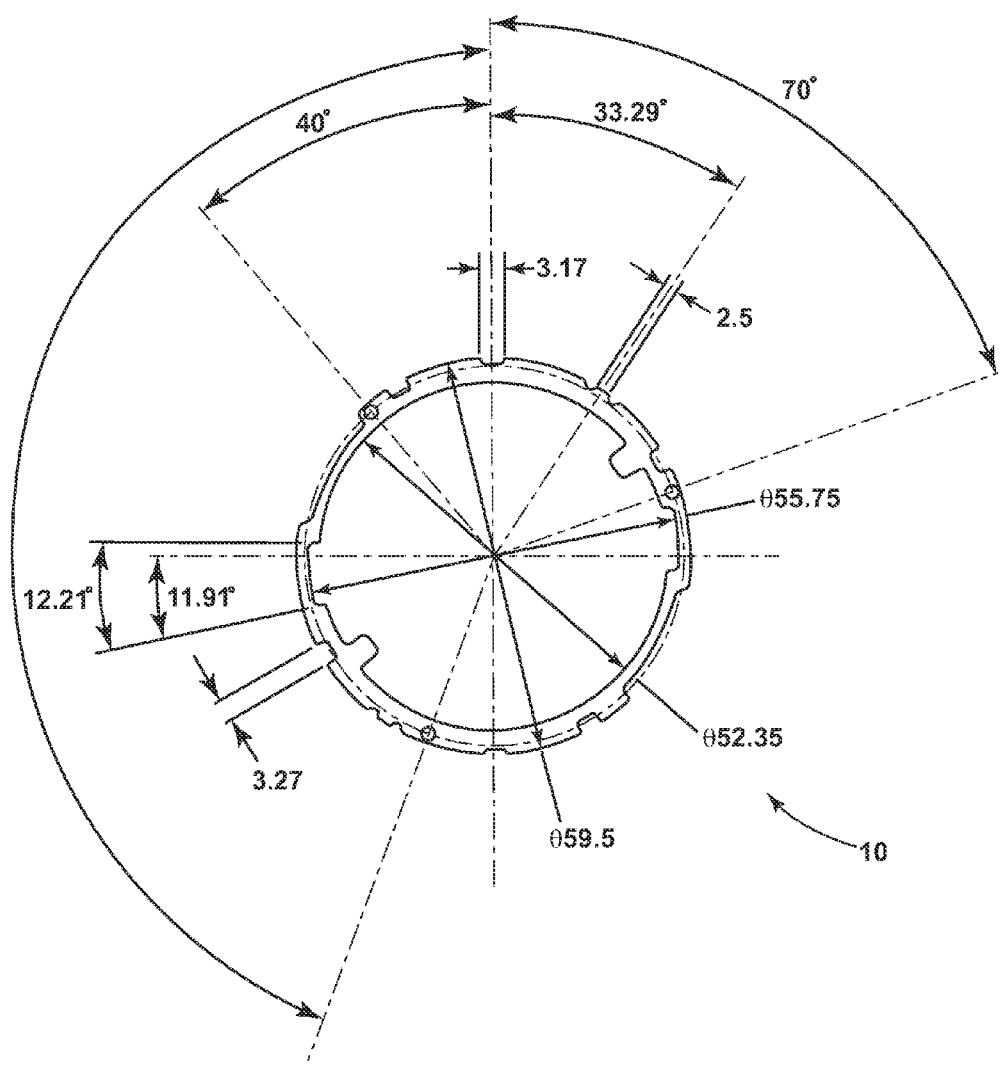
FIG. 10 is a top plan view of one embodiment of a recliner heart spacer ring of the present invention.
Figure 11:
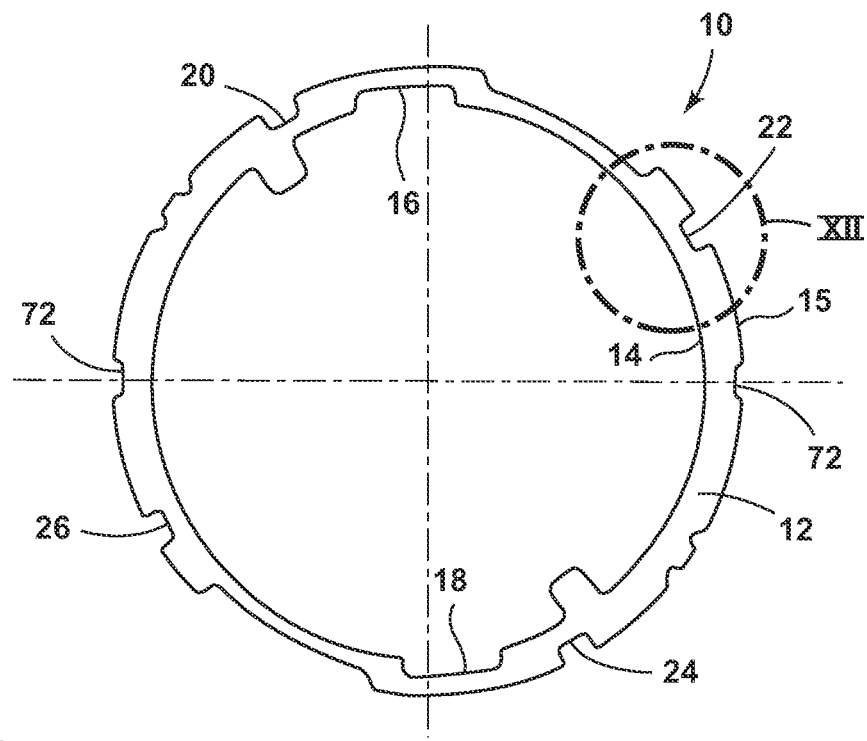
FIG. 11 is a top plan view of another embodiment of a recliner heart spacer ring of the present invention.
Figure 12:
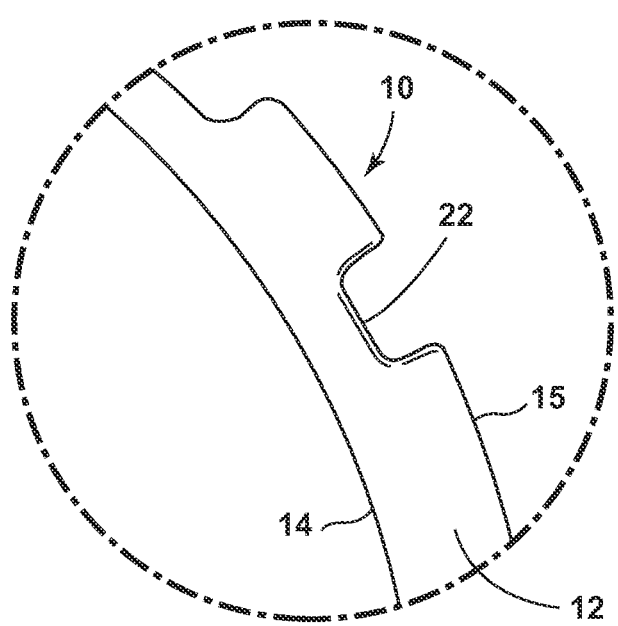
FIG. 12 is a partial top plan view of the recliner heart spacer ring of FIG. 11 taken at area XII.

The inner wall 14 of the spacer ring 10 defines an inner diameter of the spacer ring 10. In one embodiment, as illustrated in FIGS. 8 and 9, the inner diameter of the spacer ring 10 is 2 mm larger than an outer diameter defined by the outer edges 61 of the channels 58 of the swing gate 30. Because the inner diameter of the spacer ring 10 is larger than the inner diameter of the swing gate 30, the spacer ring 10 does not interfere with the swing gate 30 as the pawls 50 transition through the channels 58 of the swing gate 30 when the seat back angle is being adjusted.

Referring now to FIGS. 9-12, one embodiment of the spacer ring 10 is illustrated with the relative dimensions and angles of features of the spacer ring 10. It will be understood by a person having ordinary skill in the art that the dimensions and angles illustrated can vary without departing from the essence of the invention. The spacer ring is configured to act as a retention device to prevent the swing gate 30 from entering a failure mode. In one embodiment, the spacer ring 10 is roughly 1 mm thick and the outer retention features 20, 22, 24, 26 are spaced approximately 90 degrees apart about the outer wall 15 of the spacer ring 10. Thus, retention features 20 and 24 are diametrically opposed as are retention features 22 and 26. Similarly, the rim engagement features 72 are shown as being diametrically opposed from each other, as are the corresponding engagement features 74 of the gear rim 54 and the traditional retention tab features 70 of the swing gate 30.

It will be understood by one having ordinary skill in the art that construction of the described invention and other components is not limited to any specific material. It is contemplated that the spacer ring 10 may be constructed of a variety of materials including, but not limited to, steel or a polymeric material, such as nylon. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A recliner heart spacer ring comprising:
    a body portion having a substantially consistent inner diameter;
    first and second inner cutouts diametrically opposed from one another; and
    first and second pairs of slots adapted to engage a swing gate of a recliner heart, wherein the recliner heart spacer ring guides the swing gate as the swing gate transitions between a range of positions associated with a seat back, wherein the first and second pairs of slots are adapted to engage first and second pairs of retention tabs of the swing gate.

2. The recliner heart spacer ring of claim 1, wherein the first pair of inner cutouts includes a length that is larger than a length of the first and second pairs of slots.

3. The recliner heart spacer ring of claim 1, wherein the first and second pairs of retention tabs extend orthogonally from a planar extent of the swing gate.

4. The recliner heart spacer ring of claim 1, wherein the recliner heart spacer ring includes a plurality of rim engagement notches that are configured to engage a corresponding plurality of engagement features disposed on an interior surface of a gear rim.

5. The recliner heart spacer ring of claim 4, wherein the plurality of rim engagement notches includes a pair of rim engagement notches that are diametrically opposed to one another.

6. The recliner heart spacer ring of claim 1, wherein the first and second pairs of slots are defined by an outer wall of the recliner heart spacer ring.

7. The recliner heart spacer ring of claim 6, wherein the first and second pairs of slots are disposed at 90-degree intervals about the outer wall of the recliner heart spacer ring.

8. A recliner heart comprising:
    a recliner heart spacer ring including a body portion having a substantially consistent inner diameter;
    first and second inner cutouts diametrically opposed from one another;
    first and second outer slots diametrically opposed from one another;
    third and fourth outer slots diametrically opposed from one another; and
    a swing gate including a plurality of retention tabs that engage the first and second pairs of outer slots of the recliner heart spacer ring.

9. The recliner heart of claim 8, wherein the plurality of retention tabs extend orthogonally from a planar extent of the swing gate.

10. The recliner heart of claim 8, wherein the first and second inner cutouts of the recliner heart spacer ring include a length that is larger than a length of the first, second, third and fourth outer slots of the recliner heart spacer ring.

11. The recliner heart of claim 8, wherein the recliner heart spacer ring includes a pair of rim engagement notches that are configured to engage a corresponding pair of engagement features disposed on an interior surface of a gear rim.

12. The recliner heart of claim 11, wherein the pair of rim engagement notches are diametrically opposed from one another.

13. The recliner heart of claim 12, wherein the recliner heart spacer ring includes a first face configured to be adjacent to the swing gate and a second face that is configured to be adjacent to the gear rim.

14. A recliner heart for a vehicle seat comprising:
    a recliner heart spacer ring including a body portion having a substantially consistent inner diameter;
    first and second inner cutouts diametrically opposed from one another;
    first and second pairs of outer slots;
    a swing gate including retention tabs adapted to engage the first and second pairs of outer slots of the recliner heart spacer ring; and
    a housing disposed around the first and second pairs of slots.

15. The recliner heart of claim 14, wherein the recliner heart spacer ring includes a pair of rim engagement notches that are configured to engage a corresponding pair of engagement features of the housing.

16. The recliner heart of claim 15, wherein the housing includes a gear rim having an inner surface, and wherein the pair of engagement features are disposed on the inner surface of the gear rim.

17. The recliner heart of claim 16, wherein the recliner heart spacer ring is disposed between the swing gate and the gear rim, and wherein the recliner heart spacer ring includes a first face adjacent to the swing gate and a second face adjacent to the gear rim.

18. The recliner heart of claim 14, wherein the retention tabs of the swing gate extend orthogonally from a planar extent of the swing gate.

19. The recliner heart of claim 14, wherein the swing gate includes a plurality of channels, and wherein the plurality of channels defines an outer diameter, and wherein the outer diameter of the plurality of channels is less than the inner diameter of the recliner heart spacer ring.

* * * * *